May 22, 1962 J. F. KLAPPROTH 3,035,792
THRUST AUGMENTING POWERPLANT FOR AIRCRAFT
Filed Dec. 28, 1959
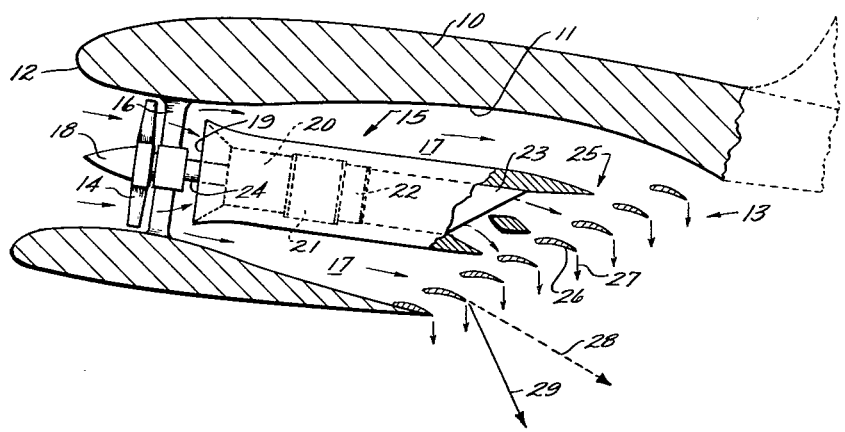
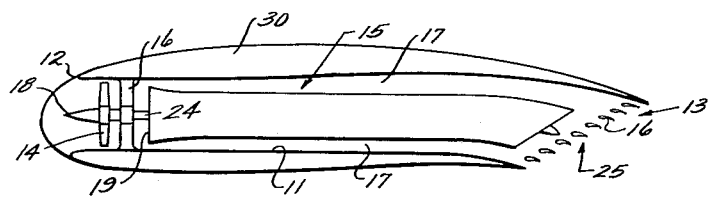
INVENTOR.
JOHN F. KLAPPROTH
BY
John F. Culle
ATTORNEY

United States Patent Office 3,035,792
Patented May 22, 1962

3,035,792
THRUST AUGMENTING POWERPLANT FOR AIRCRAFT

John F. Klapproth, Cincinnati, Ohio, assignor to General Electric Company, a corporation of New York
Filed Dec. 28, 1959, Ser. No. 862,281
7 Claims. (Cl. 244—23)

The present invention relates to a thrust augmenting powerplant arrangement and, more particularly, to a thrust augmenting means and arrangement particularly adapted for increasing the power of the primary power source in a vertical take-off and landing aircraft or short-take-off and landing aircraft.

In designing vertical take-off and landing (VTOL) and short take-off and landing (STOL) aircraft of the present era, one approach is to move large quantities of low pressure air in order to obtain vertical lift. The term VTOL, as used herein, is intended to cover both VTOL and STOL applications. With this low pressure air approach, a number of arrangements have been tried and have proven successful, such as large wing or fuselage mounted fans vertically aligned, or horizontal fuselage mounted fans. The latter are used in combination with cascades or louvers to direct the large quantities of low pressure air downward and produce an upward thrust on the vehicle. In such applications, the fans may be driven by any suitable means such as a gas turbine engine in order to pump air through the fans for ducting horizontally or vertically to provide the desired thrust on the aircraft. Such an arrangement has created problems in the loss of efficiency encountered in attempting to turn the air through large angles when directed downward for vertical thrust as well as forcing the fan to operate at unfavorable back pressures during take-off and landing operations. A particular structural arrangement to avoid these losses and at the same time permit the fan to operate under more favorable conditions is described and claimed in applicant's co-pending application Serial No. 855,915 filed November 27, 1959 and assigned to the assignee of the instant invention. That application discloses a cascade which is termed a diffusing cascade and which is defined as an arrangement or cascade of airfoils in the outlet of the air duct to turn the flow in a downward direction which, by proper orientation of the cascade axis in relation to the duct axis and the vectored thrust, permits use of low camber airfoils with a high turning angle and diffusion or deceleration of the flow through the cascade to create a low pressure region upstream of the cascade. Since the diffusing cascade forms part of the novel combination of the instant invention, reference may be had to the above application for a more complete understanding of the hardware and operation intended by the term diffusing cascade as used herein.

By a novel arrangement or combination of the structural elements of the above described fan-low pressure air-diffusing cascade VTOL powerplant, it has been discovered that it is possible to substantially increase the power from the powerplant. That is, it is possible to augment the power of such a system by increasing the power available from the primary power source which is usually a gas generator and may conveniently be a gas turbine engine. It is to be noted that this is a different concept from that disclosed in the above mentioned application which is directed to a more effective use of the power after it is obtained. By the proper and novel arrangement of the basic elements of such a powerplant as disclosed in the instant invention, it is possible to obtain more output from a given powerplant in a VTOL system than heretofore possible. For example, as a result of the arrangement or combination proposed herein, with a typical gas turbine powerplant normally rated at 1000 horsepower, it is possible to effectively obtain approximately 1500 horsepower from the same powerplant by properly orienting or arranging the basic elements of the powerplant.

The main object of the present invention is to provide an arrangement or combination of some of the basic elements of the VTOL aircraft by which the normal output of the powerplant is significantly increased.

Another object is to provide such a powerplant arrangement wherein the output of the gas generator, which may be a gas turbine engine, is significantly increased by supercharging and by the provision of a higher pressure ratio across the turbine of the gas turbine engine.

A further object of the invention is to provide such a powerplant for a VTOL aircraft wherein the structural elements of the combination may be utilized either in the fuselage or wing or other suitable body parts of the aircraft.

Briefly stated, I provide a thrust augmenting powerplant for a VTOL aircraft which includes a duct through a body of the aircraft, which may be the fuselage or wing and may generally be in a substantially horizontal direction, having a fan therein to move large quantities of low pressure air through the duct from front to back of the aircraft. The fan is driven by a gas generator which may be a gas turbine engine having its inlet adjacent the fan and downstream thereof so that the gas generator is supercharged by the fan. The duct has a by pass portion into which the gas generator discharges through a nozzle into a low pressure region to reduce the back pressure on the turbine, when a gas turbine engine is used, to increase the power obtainable from the gas turbine engine. In addition, this exhaust or discharge takes place upstream of a diffusing cascade which is provided in the duct preferably at the outlet thereof.

While the specification concludes with claims particularly pointing out and distinctly claiming the subject matter which I regard as my invention, it is believed the invention will be better understood from the following description taken in connection with the accompanying drawing in which:

FIGURE 1 is a schematic cross sectional view showing the arrangement of the elements of the instant invention as applied to the fuselage of a VTOL aircraft and;

FIGURE 2 is a partial schematic view showing the invented arrangement as applied to the wing of an aircraft.

The arrangement to be described in connection with a VTOL aircraft may be thought of as a boot-strapping principle in which it is possible to take full advantage of the air flow systems used in the thrust vectoring to increase the power of the basic gas generator.

Referring first to FIGURE 1, there is schematically shown a VTOL aircraft having a body 10, which may be a fuselage, and a duct 11 passing through the body preferably in a substantially horizontal direction as shown. Duct 11 has a forwardly directed inlet 12 to capture air as the body moves vertically as represented by the vertical axis of the drawing or horizontally as represented by horizontal axis of the drawing, and an outlet generally indicated at 13 which is preferably directed rearwardly and downwardly of the body 10. In order to force air through duct 11, there is provided a fan 14 spanning the duct and driven by any suitable gas generator such as a gas turbine engine generally indicated at 15. Gas generator 15 may be supported centrally of the duct by means of struts 16 which can also act as stator vanes to remove the swirl created by the fan 14. Other struts not shown can be used as required. The fan, in turn, is then supported by the gas generator 15 for rotation thereon as seen in FIGURE 1. Since it is desirable to by pass some of the incoming air, the struts supporting gas generator 15 space it from the duct walls 11 providing a by pass portion 17 around the gas generator. It will be apparent that the gas generator need not be centrally supported as shown in order to provide the by pass portion for purposes to be described. In order to drive the fan 14, gas generator 15 may be a conventional gas turbine engine having gearing in nose section 18 for a proper fan control speed. As a gas turbine engine, generator 15 may comprise a forwardly directed air inlet 19, a compressor section 20, a combustion section 21, a turbine section 22, and an exhaust nozzle 23.

Since it is known that supercharging will increase the output of a given air breathing powerplant, it can be seen from the structure thus far described, that the effect of the fan upstream of the inlet 19 of the gas generator 15 results in an increase in density of the air entering generator 15 resulting in more mass flow of air to the generator and thus supercharging of the gas generator 15. This factor alone, is well known and no claim is made that this arrangement thus far described is novel except insofar as it forms part of the overall combination claimed. As an example, the supercharging of the gas generator increases the flow of the working fluid of the gas generator nearly proportional to the pressure rise in the supercharging fan 14. This means that a fan with a pressure ratio of 1.17 would supercharge the gas generator and increase its flow capabilities by approximately 13 percent merely by placing it downstream of the fan so that the inlet 19 is adjacent the fan 14. By discharging the turbine to atmospheric pressure, as is usually the case, the added pressure ratio across the turbine resulting from the supercharging would increase the useful power obtained from each pound of the gas generator working fluid. Using the example above, this amounts to about 14 percent additional power per pound of air or a total increase in engine power by supercharging of about 29 percent.

The pressure on the downstream side of the turbine 22 is normally ambient pressure. Any lowering of this pressure will further increase the power output of the basic gas generator 15 by increasing the pressure ratio across the power turbine. With the present invention, it is possible to increase the pressure ratio across the turbine more than the normal pressure obtainable when the turbine discharges to ambient conditions. This is permitted by the use of a diffusing cascade generally spanning outlet 13 and indicated at 25 and which is more fully explained in the above mentioned co-pending application. A diffusing cascade consists of a series of airfoils 26 particularly oriented and having additional fluid jets 27 in the trailing edge thereof directed to deflect the normal exhaust stream 28 into a more nearly vertical direction as shown at arrow 29 wherein the arrow 29 represents the vectored thrust. As explained in the co-pending application, this diffusing cascade creates a low pressure zone in the by pass portion 17 and it is in this zone that nozzle 23 is exhausted downstream. Exhausting the gas generator products of combustion through nozzle 23 adjacent the diffusing cascade and into a low pressure region which is below ambient, increases the pressure ratio across the turbine 22 and thus the power obtainable from the turbine. This additional power, in turn, is directed into the fan 14 for further supercharging which, in turn, increases the power obtainable and again lowers the back pressure on the turbine. This boot-strapping arrangement of course continues until a level is reached at which no additional effect is apparent. This level however, in the arrangement described is considerably higher, up to about 60 percent, than the power obtainable from a basic gas generator such as a gas turbine. Supercharging and ejector action separately may increase the basic power output up to 50 percent. Thus, it can be seen that the invented arrangement permits improvement of about 10 percent greater than the cumulative sum of both supercharging and ejection.

Referring next to FIGURE 2, there is shown a body 30 which may be illustrative of the wing in a VTOL aircraft and in which the same numbered elements previously described in connection with FIGURE 1, are used in the same arrangement.

The combination of the two effects in the particular arrangement described, the supercharging and the ejector effect of exhaust nozzle 13 discharging into a low pressure by pass portion can increase the power obtainable from the powerplant by the order of 50 to 60 percent.

It will be apparent that the use of both of these effects in the same powerplant for VTOL aircraft as above described, does not result in the sum of the individual increases in power obtainable from each used separately. That is, the result is not the summation of the individual effects since it will be obvious that the supercharging affects the diffusing cascade and vice versa. Thus, the increase in power obtainable from the powerplant is greater than that of the increase obtainable by either of the two effects alone. Also, the air entering the air inlet 19 of the gas generator will be determined by the designed operating conditions of the gas generator, and the remainder will be by passed around the gas generator into the by pass portion 17.

While there has been hereinbefore described a preferred form of my invention, obviously many modifications and variations of the present invention are possible in the light of the above teachings. It is therefore to be understood that within the scope of the appended claims, the invention may be practiced otherwise than as specifically described.

I claim:

1. A thrust augmenting powerplant for a VTOL aircraft comprising, a duct through a body of the aircraft, a fan disposed in said duct, a gas generator disposed downstream of the fan to be supercharged thereby and connected to drive the fan, a by pass portion for the duct to direct air downstream of the gas generator, a diffusing cascade at the duct outlet creating a low pressure zone in the duct upstream of the cascade, and a nozzle on the gas generator discharging into the low pressure zone of the duct upstream of the diffusing cascade.

2. A thrust augmenting powerplant for a VTOL aircraft comprising, a duct through a body of the aircraft, a fan disposed in said duct, a gas generator disposed in said duct, said duct also having a by pass portion around the gas generator, said gas generator being disposed downstream of the fan to be supercharged thereby and connected to drive the fan, a diffusing cascade at the duct outlet creating a low pressure zone in the duct upstream of the cascade, and a nozzle on the gas generator discharging into the low pressure zone of the duct upstream of the diffusing cascade.

3. A thrust augmenting powerplant for a VTOL aircraft comprising, a duct through the fuselage of the aircraft, a fan spanning the duct to supply air thereto, a gas generator connected to drive said fan and disposed centrally of the duct and having an air intake downstream of the fan to be supercharged thereby, said duct having a portion by-passing the gas generator, a diffusing cascade at the duct outlet creating a low pressure zone in the duct upstream of the cascade, and a nozzle on the gas generator discharging into the low pressure zone of the duct upstream of the diffusing cascade.

4. A thrust augmenting powerplant for a VTOL aircraft comprising, a duct through the fuselage of the aircraft and having an inlet and outlet, a fan disposed in and spanning the duct adjacent the inlet to supply air thereto, a gas generator connected to drive the fan and supported centrally of the duct and spaced from the duct walls, said gas generator having a forwardly directed air intake disposed downstream of the fan to be supercharged thereby, a diffusing cascade spanning the duct outlet creating a low pressure zone in the duct upstream of the cascade, and a nozzle on the gas generator discharging into the low pressure zone of the duct upstream of the diffusing cascade.

5. A thrust augmenting powerplant for a VTOL aircraft comprising, a substantially horizontal duct extending through a body of the aircraft, said duct having a forwardly directed inlet, a fan disposed in and spanning the duct adjacent the inlet to supply air thereto, a gas generator connected to drive the fan supported centrally of the duct and spaced from the duct walls to provide a by pass portion around the gas generator, said gas generator having a forwardly directed intake disposed downstream of the fan to be supercharged thereby, a diffusing cascade disposed in and spanning the duct outlet creating a low pressure zone in the duct upstream of the cascade, and a nozzle on the gas generator discharging downstream into the low pressure zone of the duct upstream of the diffusing cascade.

6. Apparatus as described in claim 5 wherein the gas generator is a gas turbine engine connected to drive the fan.

7. A thrust augmenting powerplant for a VTOL aircraft comprising, a substantially horizontal duct extending through the fuselage of the aircraft, said duct having a forwardly directed inlet and a rearwardly and downwardly directed outlet, a gas turbine engine, means connected to the duct walls supporting the engine centrally of the duct and spaced from the duct walls to form a by pass portion around the engine, a fan supported for rotation by said engine and spanning the duct adjacent its inlet, said engine having a forwardly directed air intake adjacent the fan and downstream thereof for supercharging of the engine by the fan, a diffusing cascade disposed downstream of the engine and spanning the duct outlet creating a low pressure zone in the duct upstream of the cascade, and a nozzle on the engine discharging downstream into the low pressure zone of the duct adjacent the diffusing cascade and upstream thereof.

References Cited in the file of this patent

UNITED STATES PATENTS

| | | |
|---|---|---|
| 2,879,957 | Lippisch | Mar. 31, 1959 |
| 2,918,230 | Lippisch | Dec. 22, 1959 |

FOREIGN PATENTS

| | | |
|---|---|---|
| 522,266 | Canada | Mar. 6, 1956 |
| 1,056,481 | Germany | Apr. 30, 1959 |